Jan. 4, 1966  K. M. HOLLAND  3,227,599
PRE-CORRUGATED HONEYCOMB PACK

Filed Oct. 1, 1962  2 Sheets-Sheet 1

INVENTOR.
Kenneth M. Holland
BY
Townsend and Townsend
attorneys

Jan. 4, 1966  K. M. HOLLAND  3,227,599
PRE-CORRUGATED HONEYCOMB PACK
Filed Oct. 1, 1962  2 Sheets-Sheet 2
Fig. 6.
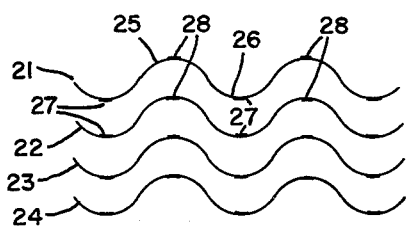
Fig. 7.
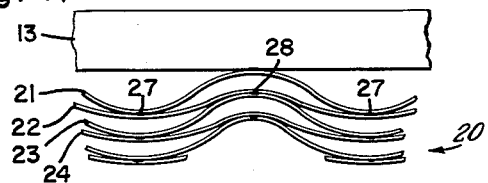
Fig. 8.
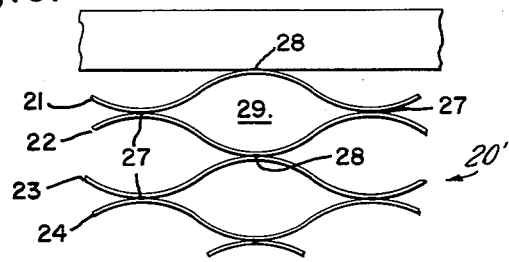
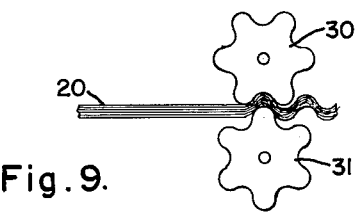
Fig. 9.
INVENTOR.
Kenneth M. Holland
BY
Townsend and Townsend
attorneys 329
United States Patent Office 3,227,599
Patented Jan. 4, 1966

3,227,599
PRE-CORRUGATED HONEYCOMB PACK
Kenneth M. Holland, Orinda, Calif., assignor to
Hexcel Products Inc., Berkeley, Calif.
Filed Oct. 1, 1962, Ser. No. 227,463
7 Claims. (Cl. 161—68)

This invention relates to an improved multicellular honeycomb structure and method for making same. More particularly, this invention relates to a pre-corrugated expandable type honeycomb structure which is principally characterized by the fact that it retains a constant width in both its unexpanded and expanded conditions.

The particular embodiment of the present invention, which is illustrated in the drawings and which will be described hereinafter in greater detail, is manufactured in the form of an unexpanded pack of honeycomb comprising a plurality of ribbons of sheet material joined together at spaced node points. The node points joining each ribbon to its two adjacent ribbons are located in staggered relation to permit the pack to be expanded into a cellular honeycomb structure of geometric cell openings. All of the ribbons in the compacted stack of material are identically corrugated with the same wave line so as to pursably contract the width of the stack (as measured in the direction of the ribbons) by an amount whereby the width of the honeycomb structure will remain the same in both unexpanded and fully expanded conditions.

It is common practice to manufacture honeycomb by the so-called "expansion" process. Generally speaking, this process involves the stacking of ribbons of flat sheet material and bonding adjacent ribbons to one another at predetermined node points thereby creating a laminated stack or pack of such material which can be expanded into an open honeycomb configuration defining geometric cell openings usually of a hexagonal or square cell configuration. The patent art shows an abundance of examples of how honeycomb can be manufactured by the expansion technique, some of which are shown in U.S. Patents Nos. 2,610,934 (Steele); 2,734,843 (Steele); 1,-924,472 (Thomson); 2,428,979 (May); 2,636,540 (Lincoln); 2,731,379 (Wheeler). The honeycomb product produced by each of the foregoing prior art processes basically comprises a pack or stack of flat ribbons or webs of material bonded together at spaced node intervals as aforesaid whereby, upon pulling the end webs apart, the pack will expand into an open cellular honeycomb structure.

Prior art or conventional honeycomb of the type above referred to is characterized by the fact that as the material is expanded from flat compacted condition into open cellular form, the ribbons or webs of material constituting the pack will bendably deform or pursably contract in length to cause a substantial narrowing of the material as it is expanded. This particular phenomena of conventional honeycomb is specifically discussed in prior U.S. Patent No. 2,674,295 (Steele et al). The fact that the flat ribbons or webs of conventional honeycomb will purse inwardly causing a general narrowing of the pack throughout its length as it is expanded can lead to a number of practical problems or difficulties, as for example:

In the first place, to secure uniform cell expansion of a given pack of honeycomb throughout its entire area, special precautions should be taken during the expansion step to permit the end webs of the material to pursably contract so as not to lead to distortion or non-uniform cell configuration adjacent the ends of the stack. This particular problem is discussed in aforementioned Patent No. 2,674,295; wherein it was proposed to attach pursable tapes to the ends of honeycomb in conjunction with relatively movable tug pins so as to permit all areas, including the end areas of the honeycomb pack, to open out or expand in the substantially uniform cell pattern. Failure to provide means for permitting the end areas of a honeycomb section to narrow or pursably contract during the expansion process will result in producing an expanded honeycomb structure of non-uniform or distorted cell configuration, particularly adjacent the end areas, which distorted cell areas in most applications must be trimmed off as waste material.

The present invention, which provides a honeycomb structure which is pre-corrugated in its unexpanded condition so as to define a constant width in both unexpanded and expanded conditions, obviously requires no special precautions or expanding means as required in conventional honeycomb to allow for narrowing of the pack as it is expanded. To the contrary, the pre-corrugated end webs of the honeycomb pack can be bonded to rigid or stiff end members without adversely affecting the ability to expand the material into uniform cell configuration throughout its entire area.

Another common difficulty or problem encountered in using conventional honeycomb of the type briefly alluded to above is that in expanding such material within the confines of a hollow rectangular frame, such as a door frame for example, and where the end webs of the honeycomb are rigidly bonded to the rails of the frame, the honeycomb as it is expanded within the frame will assume an hour-glass shape in that the central areas of the material will of necessity narrow a considerably greater amount than the end areas. This charactristic leads to a number of well understood and known difficulties or shortcomings that need not be specifically discussed herein but which are commonly encountered in the manufacture of conventional hollow doors or similar articles in which honeycomb is employed as a reinforcing core material.

As noted above, the present invention which employs a pre-corrugated pack of material will not vary in width as it is expanded to form an open cellular structure. Consequently, non of the difficulties in fabrication which are commonly encountered with the use of conventional honeycomb in the manufacture of such articles as hollow doors will be encountered utilizing honeycomb embodying the present invention.

Another advantage of honeycomb constructed according to the present invention resides in the fact that, as the material is expanded, every other ribbon in the pack will reverse its pre-corrugation curvature and this functions to restrain the expanded pack from returning to its initial unexpanded or compacted form. By way of contrast, and in reference to more conventional honeycomb made from flexible or relatively springy materials, such as paper, for example, there is a definite tendency of the honeycomb to resiliently return to its unexpanded condition. As a consequence, in expanding such types of honeycomb materials, it is necessary to either mechanically or otherwise fix the honeycomb in expanded condition to prevent the elastic memory of the material from returning it to an unexpanded or partially expanded shape. For example, paper honeycomb is often subjected to steam to soften the fibers preventing its elastic memory from returning it to its unexpanded condition. In other instances, the material is fixed in expanded shape by mechanical means or by impregnating the material with a stiffening substance of some sort. As above noted, in the present invention, alternate ribbons reverse their pre-corrugation curvature and function in themselves to fix the material in expanded shape and to mechanically restrain it from returning to its unexpanded condition.

The principal object and advantages of the present invention therefore is to produce a pre-corrugated honeycomb structure of the character briefly mentioned above and which defines a constant width honeycomb structure in both unexpanded and expanded condition.

Another object is to provide a honeycomb structure which, upon expansion, causes alternate ribbons to reverse their pre-corrugation curvature and thereby set up a built-in or inherent mechanical restraining force to overcome the elastic memory of certain types of honeycomb (such as paper) to return to unexpanded condition.

Another object is to teach several novel methods of producing honeycomb of the character herein described.

A feature of this invention resides in the fact that the ribbon pack may be formed by bonding the ribbons and then corrugating, or corrugating the ribbons and then bonding.

Other objects and advantages of this invention will become apparent when reading the following description and referring to the accompanying drawings in which similar characters of reference represent corresponding parts in each of the several views.

In the drawings:

FIG. 6 is an exploded view of the pre-corrugated ribbons prior to bonding;

FIG. 7 is a view of the bonded pack only slightly expanded; and

FIG. 8 is a partial view of the fully expanded honeycomb pack of FIGS. 6 and 7; and FIG. 9 is a schematic illustration of a corrugating process.

Figure 1:
FIG. 1 is a plan view of an unexpanded pack of conventional honeycomb in unexpanded condition with its end webs bonded to rigid end members.

FIG. 1 of the drawings illustrates a conventional pack of unexpanded honeycomb 12 to the end webs of which are rigidly adhesively bonded, or otherwise secured, stiff end pieces 13 and 14 such as the wooden stiles to be incorporated in a conventional hollow door frame.

Figure 2:
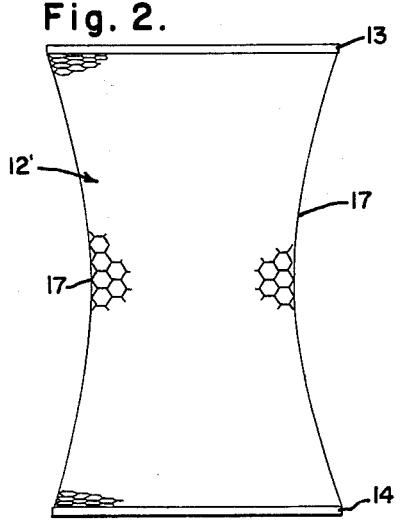
FIG. 2 is a plan view of the honeycomb pack of FIG. 1 in expanded condition and showing the hour-glass shape it assumes due to non-uniformity of cell expansion.

FIG. 2 shows the same pack of material in expanded condition and wherein it is observed that the inherent tendency of the ribbons or webs of honeycomb to pursably contract as the material expands will cause the side edges 17 of the expanded honeycomb structure 12' to bow inwardly and define an hour-glass shape. More specifically, the cell areas adjacent opposite ends of the pack cannot, by virtue of being bonded to the rigid stiles 13 and 14, pursably contract. As a consequence, the cell areas adjacent opposite ends of the pack can only partially expand as compared to the full expansion of the cells at the mid-section of the honeycomb structure. As earlier indicated, U.S. Patent No. 2,674,295 (Steele et al.) discusses the inherent tendency of conventional honeycomb to pursably narrow in the direction of the honeycomb ribbons as the pack is expanded into open cellular form.

In reference to FIG. 2, it is apparent that if the expanded honeycomb structure 12' therein shown is placed within the confines of a rectangular hollow door frame, the inwardly bowed side edges 17 of the material would not occupy the space adjacent the side rails (not shown) and would thereby leave substantial void areas within the confines of the hollow rectangular door frame.

Figure 3:
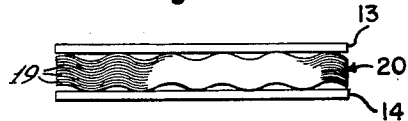
FIG. 3 is a plan view of an unexpanded pack of pre-corrugated honeycomb embodying the present invention.
Figure 4:
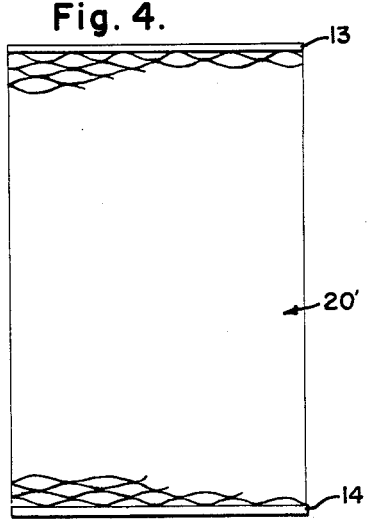
FIG. 4 is a plan view of an expanded pack of same.
Figure 5:
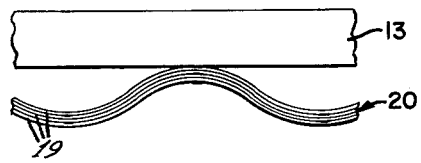
FIG. 5 is an enlarged fragmentary view of the unexpanded pack of pre-corrugated honeycomb of FIG. 3.

The pre-corrugated ribbon pack of FIGS 3 and 4 embodying the present invention eliminates these problems because of the capabilities of expanding evenly while maintaining a constant ribbon dimension or width. A plurality of stacked edge aligned pre-corrugated ribbons 19 are positioned between end webs 13 and 14 to form an expandable honeycomb pack 20. Each ribbon is contoured to the shape of the others in the same wave line or pattern and when stacked one upon the other they form a substantially solid pack having only slight mismatch between them. In the particular embodiment shown in the drawings, each corrugation is approximately the size of one-half a cell and is bonded at every crest on one side of the ribbon and at every valley on the other side of the ribbon as illustrated in FIG. 5. Although curved corrugations are illustrated, sawtooth undulations could also be used.

Tensional forces applied to end webs 13 and 14 induce the ribbons to separate along the unbonded portions causing deformation in the contour of every second ribbon. After sufficient deformation occurs, a snap spring action of the ribbon material causes the deformed ribbons to reverse in contour and form one-half of the cell walls. Since the contour of the deformed ribbons remains substantially the same and is only reversed, the lateral dimension or pack width in the ribbon direction remains nearly constant in either the expanded honeycomb 20' or unexpanded honeycomb 20. FIGS. 6 to 8 fully illustrate the above principles in detail. Each of the ribbons 21 to 24 is corrugated to have undulating crests 25 and valleys 26 along its entire length. Each one of these crests and valleys is of identical contour and each ribbon is of constant finite thickness; therefore, the radius of curvature along the top surface of crests 25 is greater than the radius of curvature along bottom surface by an amount equal to the thickness of the ribbon—the reverse being true for valleys 26. This slight radius variation prevents adjacent ribbons from snugly nesting within one another when stacked in pack form.

The mismatch problem is reduced in bonding alternate ribbons at every node crest on one ribbon side and at every node valley on the opposite ribbon side. Since the bonding material 27 forms a thin layer of a given thickness, the void between each of the ribbons is filled and becomes substantially solid without deforming the node contour to bring them into contacting relationship. However, if it is desirable to use a thin layer of bonding material or a weld, it is possible to slightly deform the individual ribbons to bring them into contacting relationship at the connecting nodes.

The ribbons are closed one upon the other in stacked relationship to create a substantially solid pack 20 such as illustrated in FIG. 5. The bonding action occurs while the ribbons are in this closed relationship and each ribbon is compressing the adjacent ribbon into close relationship with each other. After the bonding material sets, pack 20 can be expanded.

The partially expanded pack 20 of FIG. 7 illustrates the individual bonding nodes and their relationship to each adjacent ribbon. Ribbon 21 is bonded to end web 13 at each crest 25 and retains its initial contour against the influence of tension force. Ribbon 22 is bonded to both the lower surface of ribbon 21 at every valley 26 and to ribbon 23 at every crest 25. Ribbons 23 and 24 are bonded together at the upper surfaces of every valley of ribbon 24. This pattern of connecting adjacent ribbons being continued throughout pack 20—every odd numbered ribbon being bonded at the upper ribbon surface of the crests and every even numbered ribbon being bonded at the lower ribbon surface of the valleys.

The material used in the ribbons is flexible and elastic enough to return to its initial shape providing the elastic limits are not exceeded. Tensional forces in the upward direction serve only to slightly deform crests 25 of each odd numbered ribbon 21, 23, etc., while tensional forces in a downward direction cause a reverse flexure of each alternate even numbered ribbon 22, 24, etc. More specifically, and confining discussion to the inter-action between the pair of ribbons 21 and 22, it is seen that when sufficient bending or deformation occurs in ribbon 22, a snap-spring action in the material reverses the curvature of crest 25 creating a valley-like curvature. Ribbon 21 is sufficiently rigid to offer mechanical resistance to any lateral forces set up by ribbon 22 and restrains it from returning to its initial contour. This restraining force also acts to keep pack 20' in the expanded position by preventing a recollapse of cells 29 to the unexpanded state.

Ribbon 21 forms upper half of cell 29 wall while ribbon 22 forms the lower half. This portion of cell formation continues throughout ribbon pack 20' as every second ribbon reverses its curvature while the remaining ribbons retain their initial preformed or pre-corrugated cuvature.

Instead of corrugating the ribbons and then bonding, the ribbon pack 20 can be first bonded in flat ribbon or sheet form and then corrugated. More specifically, a ribbon pack 20 such as may be produced by more conventional process as disclosed for example in U.S. Patents Nos. 2,610,934 or 2,734,843, is fed through the rotating upper and lower forming dies 30 and 31 (shown schematically) to simultaneously form an undulating curvature in all the ribobns. Allowance for the thickness of ribbon pack 20 must, of course, be made in the shape of the forming face of the dies to eliminate the effects of mismatch. Moreover, during the corrugating step shearing stresses are set up along the surfaces of the adjacent ribbons of pack 20. It may be, therefore, desirable to perform the corrugating step before the bonding material has dried to permit some slippage between the ribbons in the pack during the corrugation step or to use a thermoplastic adhesive which will soften under the influence of heat and pressure which can be applied to the stack during the corrugation thereof.

It is also appreciated that instead of applying adhesive lines to both the obverse and reverse sides of each sheet that is placed in the stack as explained in reference to FIG. 6 of the drawings, it is equally satisfactory to apply glue lines in the pattern indicated in FIG. 6 to only alternate sheets in the stack. Thus, specifically referring to FIG. 6 it is entirely feasible to apply bonding lines to only the odd numbered sheets 21 and 23 in the pattern designated at 27 and 28, and to insert blank sheets (sheets to which no adhesive is applied) in lieu of the even numbered sheets 22 and 24. This basic method of making honeycomb by interleaving blank sheets with glued sheets is disclosed in U.S. Patent No. 2,734,843.

It is also feasible to make honeycomb according to the present invention by applying glue lines such as 28 to the odd numbered ribbons or sheets 21 and 23, and to apply alternate glue lines such as indicated at 27 to the even numbered sheets 22 and 24. This principle is likewise disclosed in said prior U.S. Patent No. 2,734,843.

It will be understood that various changes in the details, shape, materials, steps and arrangement of parts, which have been herein illustrated and described in order to explain the nature of the invention, may be made by those skilled in the art within the principle and scope of the invention as expressed in the appended claims.

I claim:
1. A product comprising: an unexpanded pack of honeycomb including a plurality of ribbons of sheet material in compacted stack formation joined together at spaced node points within the node points joining each ribbon to its two adjacent ribbons located in staggered relation to permit the pack to be expanded into a cellular honeycomb structure; all of the individual ribbons in said compacted stack of material being corrugated in parallel wave patterns and with the corrugated areas of adjacent ribbons compactly nested together; said stack being expandable into an open cell honeycomb structure whereby every other ribbon in the stack is caused to reverse its original corrugated curvature.

2. A product comprising: an unexpanded pack of honeycomb including a plurality of ribbons of sheet material in compacted stack formation joined together at spaced node points with the node points joining each ribbon to its two adjacent ribbons located in staggered relation to permit the pack to be expanded into a cellular honeycomb structure of nominal cell size and having a predetermined width measured in the direction in which said ribbons extend; all of the individual ribbons in said compacted stack of material being corrugated in parallel wave patterns to pursably contract the width of the stack to a dimension substantially equal to the expanded width of said stack measured in the direction of said ribbons, whereby the width of the honeycomb product is the same in both unexpanded and expanded conditions.

3. A pack of honeycomb material which maintains the same ribbon dimension before and after expansion comprising: an unexpanded pack of honeycomb including a plurality of stacked, edge aligned ribbons of flexible material joined together at equally spaced intervals, each ribbon being joined to the adjacent ribbons along aligned, alternately staggered junctions on opposite faces of the ribbon, the junctions on one side being located midway between the junctions on the opposite side; said pack of ribbons being corrugated in parallel wave patterns to have similarly shaped crests and valleys at each of the alternate junctions of said ribbons and with a set of alternate ribbons throughout the stack retaining the same corrugated wave patern after expansion as before expansion.

4. A method for manufacturing a pack of a honeycomb material which will maintain the same ribbon dimension before and after expansion, comprising the steps of: stacking and edge aligning a pack of elongated ribbons; joining the adjacent ribbons at equally spaced junction points alternately aligned midway between one another on opposite sides of the ribbons; corrugating the pack of ribbons in parallel wave patterns to have similarly shaped crests and valleys.

5. A pack of multi-cellular material which uniformly expands while maintaining a constant ribbon dimension before and after expansion comprising: an unxepanded plurality of similarly corrugated, elongated ribbons stacked one adjacent the other in parallel wave form matching relationship; the first and every subsequent odd numbered ribbon being bonded at the upper surface of every node of each undulating crest to an adjacent surface; the second and every subsequent even numbered ribbon being bonded at the lower surface of every valley node to an adjacent surface, each node being equally spaced from one another.

6. A method for making a pack of expandable honeycomb comprising the steps of: stacking a plurality of ribbons; corrugating the stack of ribbons in parallel wave form to form undulating crests and valleys; bonding the corrugated stack of ribbons at the upper surface node of the crests of every odd numbered ribbon starting with the first ribbon to adjacent surfaces; and bonding the corrugated stack of ribbons at the lower surface of the node of the valley of said odd numbered ribbons to adjacent surfaces, said odd numbered ribbons retaining the same wave form after expansion as before expansion.

7. A method for making a pack of expandable honeycomb comprising the steps of: corrugating a plurality of ribbons to form corresponding undulating crests and valleys; applying a bonding material to the upper node surface of the crests on every other ribbon; applying a bonding material to the lower node surfaces of the valleys on every alternate ribbon to every other ribbon; superposing said corrugated ribbons in a stack in parallel relationship and causing adjacent ribbons to bond to each other at alternate crests and valleys where the bonding material has been applied as aforesaid.

References Cited by the Examiner
UNITED STATES PATENTS

| | | | |
|---|---|---|---|
| 1,100,064 | 6/1914 | Ferres | 154—45.9 |
| 2,477,852 | 8/1949 | Bacon | 154—45.9 |
| 2,609,315 | 9/1952 | Engel et al. | 154—45.9 |
| 2,644,777 | 7/1953 | Havens | 154—45.9 |
| 2,654,686 | 10/1953 | Hansen | 161—68 |
| 2,670,314 | 2/1954 | Ungar | 156—197 |
| 2,734,843 | 2/1956 | Steele | 156—197 |
| 2,902,127 | 10/1959 | Waugh et al. | 154—45.9 |
| 2,962,403 | 11/1960 | Jones | 161—68 |
| 3,049,461 | 8/1962 | Beahm et al. | 156—197 |

EARL M. BERGERT, *Primary Examiner.*